March 24, 1953  C. E. VOGELEY, JR., ET AL  2,632,805
RE-ENTRANT WAVE GUIDE COUPLING DEVICE
Filed July 23, 1949

WITNESSES:
N. F. Snoser.
Thw. L. Groove.

INVENTORS
Clyde E. Vogeley, Jr. and
William L. Stahl.
BY F. E. Browder
ATTORNEY

Patented Mar. 24, 1953

2,632,805

UNITED STATES PATENT OFFICE 2,632,805

RE-ENTRANT WAVE GUIDE COUPLING DEVICE

Clyde E. Vogeley, Jr., Pittsburgh, Pa., and William L. Stahl, Chicago, Ill., assignors to Westinghouse Electric Corporation, East Pittsburgh, Pa., a corporation of Pennsylvania Application July 23, 1949, Serial No. 106,434

15 Claims. (Cl. 178—44)

This invention relates to wave guides, and relates more particularly to couplings for joining and matching a plurality of ridged wave guides to a standard wave guide.

Standard wave guides are usually rectangular while ridged wave guides have reentrant portions extending into cavities which usually are rectangular. It is often necessary to join several rigid wave guides to a standard wave guide, and in the past this has been accomplished by using a tapered coupling section or a system of magic T's. Such couplings require considerable space which is not available in some installations, particularly airborne radar systems, and are not readily adjustable for impedance matching.

An object of this invention is to reduce the space required for joining ridged wave guides to a standard wave guide.

Another object of this invention is to provide a device for joining several ridged wave guides to a standard wave guide which is readily adjustable for matching impedances.

Another object of the invention is to provide a coupling for joining a plurality of ridged wave guides to a standard wave guide in which the outputs of the ridged wave guides can readily be balanced.

In one embodiment of the invention in which four similar ridged wave guides are joined and matched to a standard wave guide, the ridged wave guides are arranged in pairs, one wave guide of each pair being placed against the other thereof with their reentrant portions extending in alignment in opposite directions so as to form a passage therebetween from the external troughs formed by their reentrant portions, which is common to both. Metal conductors fill the ends of the passages at the ends of the ridged wave guides which are joined to the standard wave guide. The pairs of ridged wave guides are placed against each other with their longitudinal axes arranged about a common central axis, and with the metal conductors at their ends in alignment. The ridged wave guides are arranged with their common longitudinal axis in alignment with the longitudinal axis of the standard wave guide to which they are to be joined, and with their ends spaced a small distance from the adjacent end of the standard wave guide. A coupling in the form of a metal collar is placed with its inner surface, adjacent one end, in contact with the outer surfaces of the ridged wave guides, and with its inner surface adjacent its other end in contact with the outer surface of the standard wave guide. Four screws, one in alignment with the cavity in each ridged wave guide, are threaded through the collar into the interior of the standard wave guide. The impedances of the ridged wave guides are matched to the impedance of the standard wave guide by adjustment of the spacing therebetween, and by adjustment of the penetration of the screws into the interior of the standard wave guide.

The invention will now be described in detail with reference to the drawing, of which:

Figure 1:
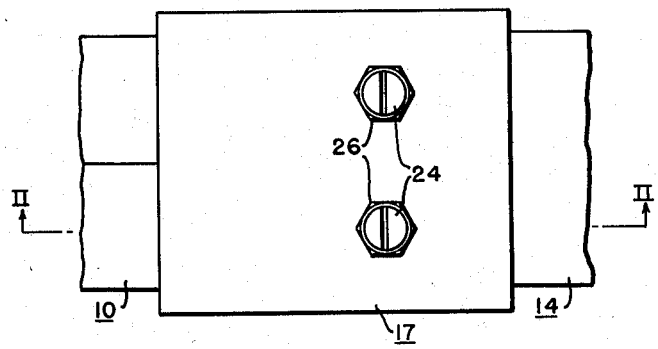
Figure 1 is a plan view looking downwardly upon one embodiment of this invention in which four ridged wave guides are joined and matched to a single, standard wave guide.
Figure 2:
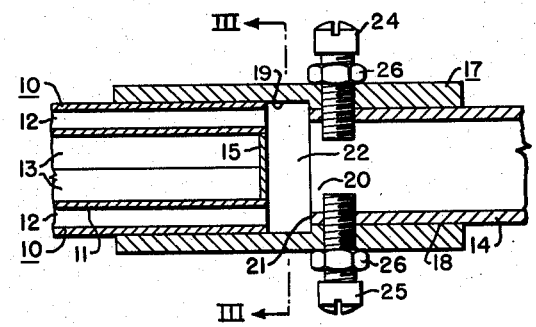
Fig. 2 is a sectional view along the lines II—II of Fig. 1.

The ridged wave guides 10 are similar, and have the reentrant ridges 11 extending into their rectangular cavities 12 and forming the troughs 13 in one of their sides of greatest dimensions. The standard wave guide 14 is rectangular.

The ridged wave guides 10 are arranged in pairs, one wave guide of each pair being placed against the other wave guide thereof so that their reentrant ridges 11 extend in opposite directions, and form therebetween rectangular passages made up from two troughs 13. The ends of the ridged wave guides terminate flush with each other, and the troughs at such ends are filled with the metal conductors 15 which extend thereacross flush with such ends.

Figure 3:
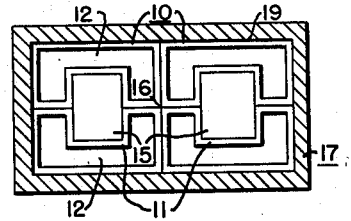
Fig. 3 is a sectional view along the lines III—III of Fig. 2.
Figure 4:
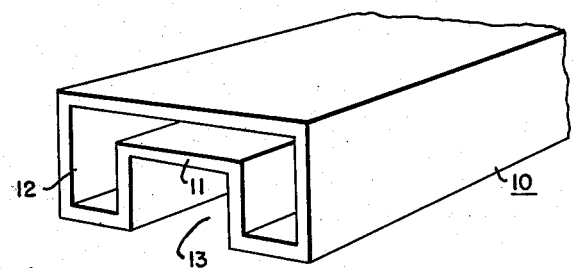
Fig. 4 is a perspective view of one of the ridged wave guides.

The pairs of ridged wave guides are placed against each other so that sides of the wave guides of one pair which are perpendicular to their sides in which the external troughs are formed, extend in alignment and in contact with corresponding sides of the wave guides of the other pair as illustrated by Fig. 3 of the drawing. The four ridged wave guides are thus arranged about a common, longitudinal, central axis 16.

The metal collar 17 has two rectangular openings 18 and 19 having a common longitudinal axis, the opening 18 being of such dimensions that its sides fit tightly against the outer surfaces of the standard wave guide 14, which is positioned therein so that its inner end 20 terminates flush with the inner end 21 of the opening 18. The collar and the standard wave guide are secured tightly together in this position as by soldering. The opening 19 in the collar 17 has such dimensions that its sides make a snug sliding fit with the outer surfaces of the two pairs of ridged wave guides when fitted together as described in the foregoing. The common longitudinal axis 16 of the ridged wave guides extends in alignment with the common longitudinal axis of the openings 18 and 19 in the collar 17. The ridged wave guides are so positioned in the collar 17 that the space 22 is formed between the conductors 15 at the ends of the ridged wave guides, and the end 20 of the standard wave guide.

The two screws or probes 24 are threaded through one wall of the collar 17 and a corresponding wall of the standard wave guide 14, into the interior thereof so that they extend into spaces therein which are in alignment with the centers of the cavities of the two ridged wave guides which are arranged side by side, and the two similar screws or probes 25 are threaded through the opposite walls of the collar and of the standard wave guide into the interior thereof, so that they extend into spaces therein which are in alignment with the centers of the cavities of the other two ridged wave guides. The distances the screws 24 and 25 extend into the interior of the standard wave guide are adjustable by the application of a screw driver, and the locknuts 26 are provided for locking the screws in their selected positions.

The matching of the impedances of the ridged wave guides to the standard wave guide can be accomplished by slidably positioning the ridged wave guides in the collar for varying the width of the space 22, and by varying the penetration of the screws 24 and 25 which function as probing members, into the interior of the standard wave guide. The achievement of a good match can be explained in terms of cancellations due to reflections from the screws, and to the discontinuities created by the ends of the wave guides. Tests have demonstrated that by proper adjustment of the screws and of the space 22, a voltage standing wave ratio of 1.03 can be obtained by such a joint. The use of the screws provides a match over a wider range than that provided by variation of the space 22 alone.

A balanced output from the ridged wave guides as well as a well matched joint can also be assured by proper adjustment of the screw penetrations into the interior of the standard wave guides, and the space between the ends of the ridged and standard wave guides.

Using this invention in a radar system having a carrier wave with a wave length of 3.165 centimeters, a collar of only about one inch in length was required for properly joining and matching the ridged wave guides to a standard wave guide.

The term wave guide, as used herein, means a hollow conductor adapted to enable efficient propagation therealong of electromagnetic wave energy.

The term ridged wave guide, as used herein, means a hollow conductor adapted to enable efficient propagation therealong of electromagnetic wave energy, which conductor is of substantially rectangular cross-section except for a reentrant portion in one side extending along the length, or long dimension, of the wave guide.

Although we have shown and described a specific embodiment of our invention, we are aware that modifications thereof are possible. Our invention is not, therefore, to be restricted except insofar as is necessitated by the prior art and the spirit of the invention.

We claim as our invention:

1. In combination, two pairs of ridged wave guides, the wave guides of each pair having their sides in which external troughs are formed by their reentrant portions, in contact, with the troughs extending parallel and forming a common passage between the wave guides, the wave guides of each pair having sides perpendicular to the sides in which the troughs are formed, extending parallel to and in contact with corresponding sides of the wave guides of the other pair, a standard wave guide in longitudinal alignment with said wave guides and having its end nearest said ridged wave guides spaced from the ends of said ridged wave guides nearest said standard wave guide, conductors substantially filling the ends of said passages at said ends of said ridged wave guides, and a collar of conductive material extending around and in contact with said ridged and standard wave guides.

2. The combination claimed in claim 1 in which means is provided for matching the impedances of the ridged and standard wave guides.

3. The combination claimed in claim 1 in which the spacing between the ends of the ridged end of the standard wave guides is adjustable.

4. The combination claimed in claim 1 in which probing members extend through the collar and into the interior of the standard wave guide in alignment with the external troughs of said ridged wave guides.

5. In combination, a pair of ridged wave guides having re-entrant portions extending along their length and forming external troughs extending with their longitudinal axes parallel and with a side of each in contact with a side of the other, a standard wave guide in longitudinal alignment with said wave guides and with its end nearest said ridged guides spaced from and adjustable with respect to, the ends thereof, conductors substantially filling the external troughs formed by the reentrant portions of said ridged wave guides at said ends thereof, and a collar of conductive material extending around and in contact with said ridged and standard wave guides.

6. In combination, a pair of ridged wave guides having re-entrant portions extending along their length and forming external troughs extending with their longitudinal axes parallel and with a side of each in contact with a side of the other, a standard wave guide in longitudinal alignment with said ridged wave guides and with its end nearest said ridged guides spaced from the ends thereof nearest said standard wave guide, conductors substantially filling the external troughs formed by the reentrant portions of said ridged wave guides at said ends thereof, a collar of conductive material extending around and in contact with said ridged and standard wave guides, and probing members extending through said collar and into the standard wave guide in alignment with the cavities in said ridged wave guides.

7. In combination, a pair of ridged wave guides having re-entrant portions extending along their length and forming external troughs extending with their longitudinal axes parallel and with a side of each in contact with a side of the other, a standard wave guide in longitudinal alignment with said wave guides and with its end nearest said ridged wave guides spaced from and adjustable with respect to, the ends thereof nearest said standard wave guide, conductors substantially filling the external troughs formed by the reentrant portions of said ridged wave guides at said ends thereof, a collar of conductive material extending around and in contact with said ridged and standard wave guides, and probing members extending through said collar and into the standard wave guide in alignment with the cavities in said ridged wave guides.

8. In combination, a pair of ridged wave guides having sides in which external troughs are formed by their reentrant portions, said sides being in contact with each other, with the troughs extending parallel and forming a common passage between the ridged wave guides, a standard wave guide in longitudinal alignment with said wave guides and having its end nearest said ridged wave guides spaced from and adjustable with respect to, the ends thereof nearest said standard guide, conductors substantially filling the end of said external troughs at said ends of said ridged wave guides, and a collar of conductive material extending around and in contact with said ridged and standard wave guides.

9. In combination, a pair of ridged wave guides having re-entrant portions and having sides in which external troughs are formed by their re-entrant portions, in contact, with the troughs extending parallel and forming a common passage between the ridged wave guides, a standard wave guide in longitudinal alignment with said wave guides and having its end nearest said ridge wave guides spaced from said ends, conductors substantially filling the ends of said external troughs at said ends of said ridged wave guides, a collar of conductive material extending around and in contact with said ridged and standard wave guides, and probing members extending through said collar and into the standard wave guide in alignment with the re-entrant portions of said ridged wave guides.

10. In combination, a pair of ridged wave guides having sides in which external troughs are formed by their reentrant portions, in contact, with the troughs extending parallel and forming a common passage between the ridged wave guides, a standard wave guide in longitudinal alignment with said wave guides and having its end nearest said ridge wave guides spaced from and adjustable with respect to, the ends of said ridge wave guides nearest said standard wave guides, conductors substantially filling the ends of said external troughs at said nearest ends of said ridged wave guides, a collar of conductive material extending around and in contact with said ridged and standard wave guides, and probing members extending through said collar and into the standard wave guide in alignment with the re-entrant portions of said ridged wave guides.

11. In combination, a pair of ridged wave guides extending with their longitudinal axes parallel and with sides perpendicular to the sides in which external troughs are formed by re-entrant portions, in contact, a standard wave guide in longitudinal alignment with said wave guides and with its end nearest said ridged wave guides spaced from, and adjustable with respect to, the ends of said ridged wave guides nearest said standard wave guide, said external troughs at said ends of said ridged wave guides being filled with a conductive material, and a conductive collar extending around and in contact with said ridged and standard wave guides.

12. In combination, a pair of ridged wave guides extending with their longitudinal axes parallel and with sides perpendicular to the sides in which external troughs are formed by reentrant portions, in contact, a standard wave guide in longitudinal alignment with said wave guides and with its end nearest said ridged wave guides spaced from the ends of said ridged guides nearest said standard guide, said external troughs at said ends of said ridged wave guides being filled with a conductive material, a conductive collar extending around and in contact with said ridged and standard wave guides, and probing members extending through said collar and into said standard wave guide in alignment with said re-entrant portions of said ridged wave guides.

13. In combination, a pair of ridged wave guides extending with their longitudinal axes parallel and with sides perpendicular to the sides in which external troughs are formed by re-entrant portions, in contact, a standard wave guide in longitudinal alignment with said wave guides and with its end nearest said ridged wave guides spaced from, and adjustable with respect to, the ends of said ridged wave guides nearest said standard wave guide, said external troughs at said ends of said ridged wave guides being filled with a conductive material, a conductive collar extending around and in contact with said ridged and standard wave guides, and probing members extending through said collar and into said standard wave guide in alignment with said re-entrant portions of said ridged wave guides.

14. In combination, a first pair of ridged wave guides and a second pair of ridged wave guides, each of said pairs of ridged wave guides comprising an upper ridged wave guide and a lower ridged wave guide each having four sides forming a conducting channel and having a re-entrant portion in one of said sides extending longitudinally along the length of said ridged wave guides, said upper guide and said lower guide extending with axes parallel, and having their said sides with re-entrant portions adjacent each other, a conducting material substantially filling the region between said conducting channel of said upper and the conducting channel of said lower; said first pair lying adjacent to and with axes parallel to the axis of said second pair; a standard wave guide in longitudinal alignment with said first pair and said second pair but separated therefrom; a collar of electrically conducting material encircling said first pair, said second pair, said standard wave guide and the region between said standard guide and said ridged guides and in contact with said guides.

15. Apparatus substantially as described in claim 14, characterized in that the upper guide of said first pair lies adjacent the upper guide of said second pair and the lower guide of said first pair lies adjacent the lower guide of said second pair.

CLYDE E. VOGELEY, Jr.
WILLIAM L. STAHL.

REFERENCES CITED

The following references are of record in the file of this patent:

UNITED STATES PATENTS

| Number | Name | Date |
| --- | --- | --- |
| Re. 23,131 | Webber | June 28, 1949 |
| 2,129,669 | Bowen | Sept. 13, 1938 |
| 2,423,130 | Tyrrell | July 1, 1947 |
| 2,513,205 | Roberts | June 27, 1950 |